United States Patent
Manley

(10) Patent No.: US 10,102,757 B2
(45) Date of Patent: Oct. 16, 2018

(54) SECURE UNMANNED VEHICLE OPERATION AND MONITORING

(71) Applicant: Just Innovation, Inc., Kingston, MA (US)

(72) Inventor: Justin Evan Manley, Kingston, MA (US)

(73) Assignee: Just Innovation, Inc., Kingston, MA (US)

( * ) Notice: Subject to any disclaimer, the term of this patent is extended or adjusted under 35 U.S.C. 154(b) by 0 days.

(21) Appl. No.: 15/170,814

(22) Filed: Jun. 1, 2016

(65) Prior Publication Data
US 2017/0053537 A1 Feb. 23, 2017

Related U.S. Application Data

(60) Provisional application No. 62/208,668, filed on Aug. 22, 2015.

(51) Int. Cl.
*G08G 5/00* (2006.01)
*G05D 1/00* (2006.01)

(52) U.S. Cl.
CPC ......... *G08G 5/0069* (2013.01); *G05D 1/0022* (2013.01); *G05D 1/0077* (2013.01); *G08G 5/006* (2013.01); *G08G 5/0039* (2013.01); *G08G 5/0056* (2013.01); *G08G 5/0091* (2013.01)

(58) Field of Classification Search
CPC . H04L 63/10; H04L 63/0861; H04L 63/0435; H04L 63/0853; H04W 12/06; H04W 12/08; B64C 39/024
See application file for complete search history.

(56) References Cited

U.S. PATENT DOCUMENTS

| | | | |
|---|---|---|---|
| 6,801,941 B1 | 10/2004 | Stephens et al. |
| 7,415,331 B2 | 8/2008 | Dapp et al. |
| 8,219,799 B1 | 7/2012 | Lucchesi et al. |
| 8,355,834 B2 | 1/2013 | Duggan et al. |
| 8,751,147 B2 | 6/2014 | Colwell |
| 8,857,754 B2 | 10/2014 | Ferrari et al. |
| 8,958,928 B2 | 2/2015 | Seydoux et al. |
| 9,022,324 B1 | 5/2015 | Abhyanker |
| 9,031,732 B1 | 5/2015 | Cudak et al. |

(Continued)

FOREIGN PATENT DOCUMENTS

| | | |
|---|---|---|
| WO | WO2017034839 A1 | 3/2017 |
| WO | WO2017034840 A1 | 3/2017 |

OTHER PUBLICATIONS

Kim et al. "Cyber Attack Vulnerabilities Analysis for Unmanned Aerial Vehicles" American Institute of Aeronautics and Astronautics, Jun. 2012, pp. 1-30.

(Continued)

*Primary Examiner* — Behrang Badii
*Assistant Examiner* — Daniel L Greene
(74) *Attorney, Agent, or Firm* — Carr & Ferrell LLP

(57) ABSTRACT

Systems and methods for unmanned vehicle security and monitoring are provided herein. In exemplary embodiments, a redundant sensor and control system is used for monitoring and controlling the unmanned vehicle. The redundant sensor and control system is operable to override the control station and take over control of the unmanned vehicle when at least one operational condition of the unmanned vehicle exceeds an approved parameter.

20 Claims, 4 Drawing Sheets

(56) References Cited

U.S. PATENT DOCUMENTS

| | | |
|---|---|---|
| 9,031,733 B1 | 5/2015 | Licis et al. |
| 9,037,337 B1 | 5/2015 | Cudak et al. |
| 9,075,415 B2 | 7/2015 | Kugelmass |
| 9,087,451 B1 | 7/2015 | Jarrell |
| 9,100,361 B1 | 8/2015 | Lucchesi et al. |
| 2005/0114023 A1* | 5/2005 | Williamson .......... G01C 21/165 701/472 |
| 2008/0114544 A1* | 5/2008 | Liu ....................... G01C 21/165 701/480 |
| 2010/0001902 A1 | 1/2010 | Smith |
| 2010/0302359 A1 | 12/2010 | Adams et al. |
| 2013/0173088 A1 | 7/2013 | Callou et al. |
| 2014/0010371 A1 | 1/2014 | Khazan et al. |
| 2014/0152422 A1 | 6/2014 | Breed |
| 2014/0157041 A1 | 6/2014 | Danielsson et al. |
| 2014/0244078 A1* | 8/2014 | Downey .............. G05D 1/0055 701/11 |
| 2014/0244097 A1 | 8/2014 | Colwell |
| 2014/0254896 A1 | 9/2014 | Zhou et al. |
| 2014/0277854 A1 | 9/2014 | Jones et al. |
| 2015/0081156 A1 | 3/2015 | Trepagnier et al. |
| 2015/0094883 A1* | 4/2015 | Peeters .................. B64C 19/00 701/3 |
| 2015/0168144 A1 | 6/2015 | Barton et al. |
| 2015/0170524 A1* | 6/2015 | Stefani ................. G08G 5/0013 701/120 |
| 2015/0175263 A1* | 6/2015 | Reyes ................... B64C 39/024 701/2 |
| 2015/0205298 A1 | 7/2015 | Stoschek et al. |
| 2015/0211870 A1* | 7/2015 | Nickolaou ............. G01C 21/34 701/28 |
| 2015/0223080 A1 | 8/2015 | Pulleti et al. |
| 2015/0242972 A1 | 8/2015 | Lemmey et al. |
| 2016/0327959 A1 | 11/2016 | Brown et al. |
| 2017/0054725 A1 | 2/2017 | Manley |

OTHER PUBLICATIONS

Luong et al. "Securing Embedded Systems for Unmanned Aerial Vehicles" Worcester Polytechnic Institute [online], Apr. 24, 2013, Retrieved from the Interner: <https://www.wpi.edu/Pubs/E-project/Available/E-project-042413-153504/>,182 pages.

Javaid et al. "Single and Multiple UAV Cyber-Attack Simulation" EAI Endorsed Transaction on Scalable Information Systems, Jan. 2, 2015. vol. 2, Issue 4, pp. 1-11.

Hartmann et al. "The Vulnerability of UAVs to Cyber Attacks—An Approach to the Risk Assessment" In 2013 5th International Conference on Cyber Conflict, 23 pages.

Patent Cooperation Treaty Application No. PCT/US2016/046935, "International Search Report" and "Written Opinion of the International Searching Authority," dated Oct. 28, 2016, 9 pages.

Patent Cooperation Treaty Application No. PCT/US2016/046934, "International Search Report" and "Written Opinion of the International Searching Authority," dated Oct. 28, 2016, 8 pages.

* cited by examiner

SECURE UNMANNED VEHICLE OPERATION AND MONITORING

CROSS REFERENCE TO RELATED APPLICATIONS

This application claims the benefit of U.S. Provisional Application Ser. No. 62/208,668, filed on Aug. 22, 2015, entitled "Device for securing the communications and/or operation of an unmanned vehicle," which is hereby incorporated in its entirety including all references and appendices cited therein.

FIELD OF THE INVENTION

The present technology of this application is directed generally to unmanned vehicle security and management, and more specifically, but not by way of limitation, to systems and methods for securing unmanned vehicle operation and monitoring.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

As unmanned vehicles become more prevalent, maintaining security of these devices is a concern, as is managing compliance with regulatory schemes. As these vehicles are generally remotely controlled, traditional approaches to wireless security for unmanned vehicle operations attempt to secure the communications using software alone. As such, unmanned vehicles are vulnerable to a software attack, such as by a hacker. Embodiments of the present disclosure provide for secure wireless monitoring and control of an unmanned vehicle.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one embodiment, the present technology is directed to a system for unmanned vehicle security and monitoring, the system comprising: a control station; an unmanned vehicle in communication with the control station via a network; and a redundant sensor and control system physically attached to the unmanned vehicle and that is operable to communicate with a third party, the redundant sensor and control system being independent of any other control system of the unmanned vehicle.

In various exemplary embodiments, the redundant sensor and control system monitors environmental data around the unmanned vehicle, which may include at least satellite positioning data. The redundant sensor and control system may also initiate autopilot control of the unmanned vehicle or activate a kill switch for operation of the unmanned vehicle if the monitored environmental data violates at least one approved operating condition for operation of the unmanned vehicle.

Other features, examples, and embodiments are described below.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
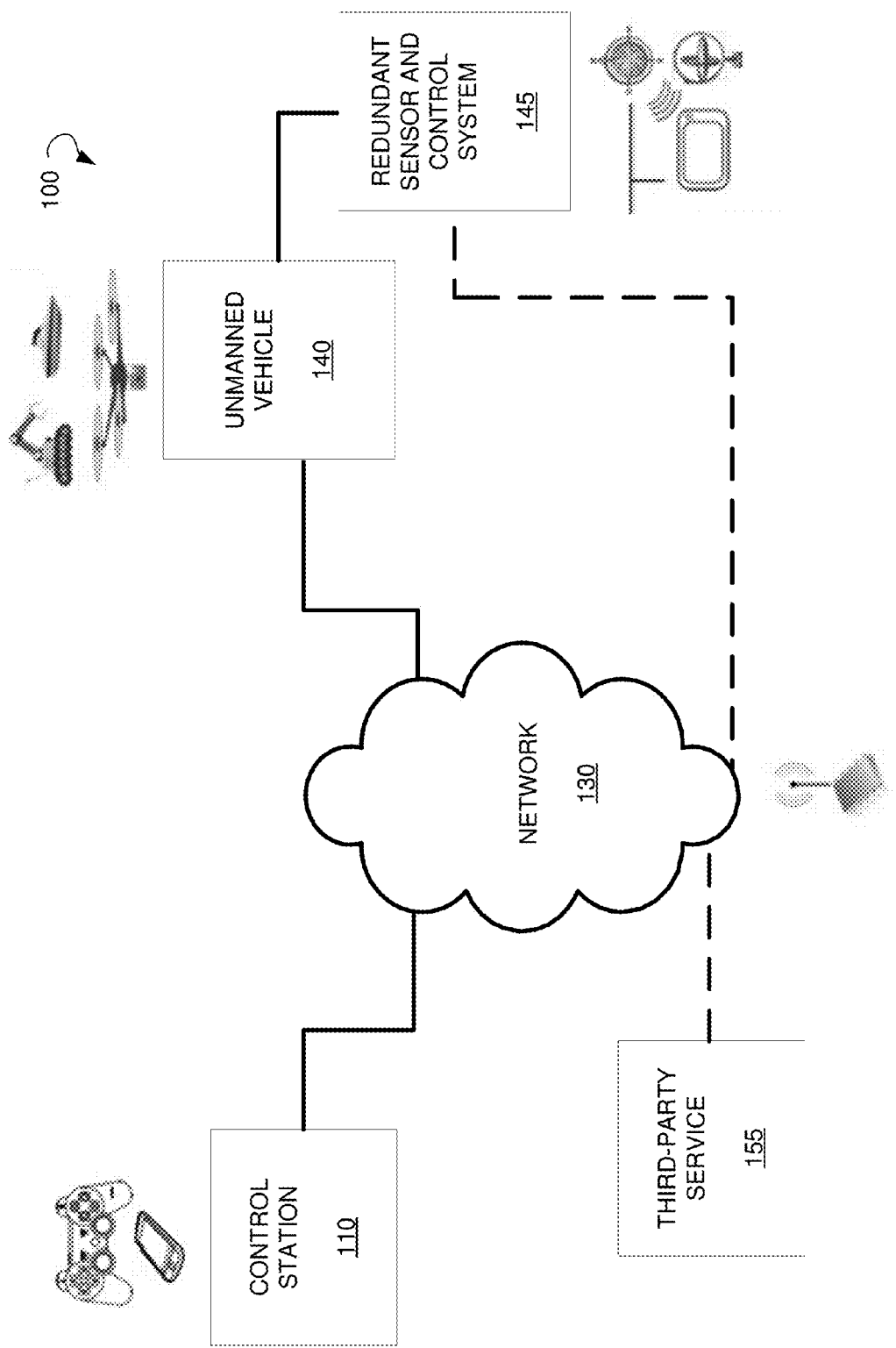
FIG. 1 is a simplified block diagram of a system for unmanned vehicle security and monitoring, according to some embodiments of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or in "an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Various embodiments of the present technology provide independent sensors from the sensors of the unmanned vehicle for monitoring and controlling the behavior of unmanned vehicle operation. For example, if the control system of an unmanned vehicle is compromised and not responsive to control by the operator, the sensors of the unmanned vehicle for monitoring and controlling the behavior of unmanned vehicle operation are no longer reliable. Embodiments of the present technology allow a user or third-party service to define operating conditions and measure the operation of the unmanned vehicle within those conditions using redundant sensors.

Embodiments of the present technology provide secure authorized wireless communication between an unmanned vehicle and the operator of the unmanned vehicle and ensure the controlled device is operating within approved conditions. Various embodiments include monitoring by the redundant sensor and control system of the unmanned vehicle to ensure it is operating within approved conditions.

Embodiments of the present technology provide redundant sensors to monitor and control the operation of the unmanned vehicle. The redundant sensor and control systems can be added to existing unmanned vehicles and their control systems, or inserted into the pre-manufacture design of unmanned vehicles and their control systems.

Embodiments of the present technology provide redundant monitoring and control of the operation of the unmanned system, using some or all of the unmanned vehicle's onboard sensors.

FIG. 1 illustrates a system for unmanned vehicle security and monitoring (system) 100, according to some embodiments. The system 100 includes a redundant sensor and control system 145, a control station 110, a network 130, and an unmanned vehicle 140. In various embodiments, the redundant sensor and control system 145 communicably couples with the unmanned vehicle 140 directly, or to an access control device of the unmanned vehicle. The redundant sensor and control system may optionally be in communication with a third party service 155. The third party service can comprise a government regulating entity, such as the Federal Aviation Administration (FAA), a private company subscription service, or another entity. The third party service 155 may provide the operating parameters that are monitored by the redundant sensor and control system, violation of which may trigger the redundant sensor and control system to disable control of the unmanned vehicle 140 by the control station 110.

In some embodiments, the control station 110, the unmanned vehicle 140, and the redundant sensor and control system 145 include a computing device. A computing device is described further in relation to computer system 400 in FIG. 4.

The control station 110, the unmanned vehicle 140, and the redundant sensor and control system 145 may communicatively couple via a public or private network, such as the network 130. Suitable networks (e.g., network 130) may include or interface with any one or more of wireless networks known to those of ordinary skill in the art. Exemplary wireless networks may include communications over radio frequencies, such as for example, digital spread spectrum radio control. Other exemplary wireless networks may include, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection.

Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 130 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In various embodiments, the control station 110 includes at least one of a personal computer (PC), hand held computing system, telephone, mobile computing system, workstation, tablet, phablet, wearable, mobile phone, server, minicomputer, mainframe computer, or any other computing system (e.g., computer system 400). The control station 110 may be any system configured to control the unmanned vehicle 140. The control station 110 communicably couples to the unmanned vehicle 140 using at least one of wired and wireless communications interfaces. By way of example and not limitation, wireless communications may be one or more of Digital Enhanced Cordless Telecommunications Ultra Low Energy (DECT ULE) (e.g., according to the European Telecommunications Standards Institute (ETSI)), WiFi 221 (e.g., IEEE 802.11), cellular/mobile network (e.g., GSM, CDMA, etc.), Bluetooth and/or BLE (e.g., according to the Bluetooth Special Interest Group), ZigBee (e.g., IEEE 802.15), ZWave (e.g., according to the Z-Wave Alliance), and the like.

In exemplary embodiments, redundant sensor and control system 145 may further be in communication with an access control device of unmanned vehicle 140, an access control device of control station 110, or both. These access control devices can be hardware device configured for accepting authentication input from an operator, human or electronic. In some embodiments, an access control device can be physically attached to the control station 110 and communicably coupled, using the network 130, with the unmanned vehicle 140. An access control device may also, or alternatively, be physically attached to the unmanned vehicle 140 and communicable coupled, using network 130, with the control station 110. In other embodiments, an access control device is in communication with the control station or unmanned vehicle in a wired or wireless manner.

The access control devices can be configured to receive authentication input by an operator. In various embodiments, the authentication input can be biometric authentication, and/or a token-based identification system, and/or a knowledge-based identification system. For example, a hardware device that accepts biometric authentication using biometric identifiers of the operator including one or more of a fingerprint, face recognition, voice authentication, a palm print, hand geometry, iris recognition, retina recognition, a deoxyribonucleic acid (DNA) sample, and the like may be used.

In other embodiments, an access control device may be a hardware device that accepts token-based identification using a personal identification document of the operator including one or more of an unmanned vehicle license, a government issued identification, a smart card, and the like. It may be equipped with scanners and/or cameras to read documents and identifying cards, or equipped with a chip reader or magnetic strip reader, such as those found on credit cards or hotel room keys, to accept an authentication input via these methods as well.

In other example embodiments, an access control device may be a hardware device that accepts knowledge-based identification using at least one of a password and a personal identification number or code.

In some embodiments, the unmanned vehicle 140 is an unmanned aerial vehicle (UAV), an unmanned ground vehicle (UGV), an unmanned surface vehicle (USV), an unmanned underwater vehicle (UUV), and the like. In various embodiments, the unmanned vehicle 140 may be any autonomous or unmanned vehicle. For example, the UAV may be a quadcopter or other drone. The unmanned vehicle 140 communicably couples to the control station 110 using at least one of wired and wireless communications interfaces.

In various embodiments, the redundant sensor and control system 145 is independent of any other sensors used for operation and monitoring of the unmanned vehicle 140. Thus, the redundant sensor and control system 145 provides a mechanism to monitor and verify the operations of the unmanned vehicle 140. Additionally, because the redundant sensor and control system 145 is independent of any other sensors used by the unmanned vehicle 140, the redundant sensor and control system 145 may be added to any unmanned or autonomous vehicle. The redundant sensor and control system 145 communicably couples to the unmanned vehicle 140 using at least one of wired and wireless communications interfaces.

In other embodiments, the redundant sensor and control system 145 can use data from sensors from unmanned vehicle 140, and provide independent processing of data from the sensors to provide independent verification that the unmanned vehicle 140 is operating within approved parameters. Redundant sensor and control system 145 may also operate via some independent sensors and some sensors previously onboard unmanned vehicle 140.

Redundant sensor and control system 145 can be implemented as a hardware and software device, or as software only. The redundant sensor and control system 145 may be accessible to a user via a controller similar to that discussed above for the control station 110.

According to various embodiments, the redundant sensor and control system 145 uses one or more of a satellite sensor system (e.g., GPS), a compass, an accelerometer, a gyroscope, an altimeter, a motion sensor, radar, a barometer, a thermometer, a camera, thermal imaging, and the like, to determine operating parameters (such as position and orientation) of the unmanned vehicle 140. The redundant sensor and control system 145 may use any sensor to redundantly monitor the operation of the unmanned vehicle 140. Significantly, the redundant sensor and control system 145 may initiate a change in operation of the unmanned vehicle 140 when the operation of the unmanned vehicle 140 becomes compromised. In some embodiments, the redundant sensor and control system 145 is physically attached to the unmanned vehicle 140.

In various embodiments, the redundant sensor and control system 145 monitors environmental data around the unmanned vehicle 140, such as speed, direction, altitude, position, etc. In some instances, one or more microprocessor or processor of redundant sensor and control system 145 compares the measured data against known approved operating conditions. In other embodiments, the redundant sensor and control system 145 may receive data from its own sensors, or data onboard the unmanned vehicle 140, and analyze the environmental data and approved operational data, the approved operational data including at least conditions for approved operation of the unmanned vehicle 140.

In some embodiments, the approved operational data is stored before launch of the unmanned vehicle 140 in memory of the unmanned vehicle 140 and/or the redundant sensor and control system 145. The approved operational data includes a no entry zone, and/or an operator generated condition, and/or other operational data from a third-party service, such as a government regulator or private company service. In exemplary embodiments, the approved operational data is a configurable flight zone database and the configurable flight zone database is downloaded to an unmanned vehicle (e.g., drone). The unmanned vehicle is programmed to respect the areas identified in the configurable flight zone database and not to fly into them (i.e., a no entry zone or a no fly zone). In some instances, the approved operational data may be areas determined by a government or private entity to be controlled, restricted, and/or prohibited. In other instances, the approved operational data may be areas prohibited by an operator.

In various embodiments, the approved operational data is dynamically updated in the memory by real-time communication. For example, the approved operational data (e.g., configurable flight zone database) is delivered to an unmanned vehicle periodically to include updates. Alternatively, a Wi-Fi enabled or other Internet connected unmanned vehicle 140 updates the approved operational data during operation and/or charging of the unmanned vehicle 140. The present technology may thereby aggregate the privacy preferences and/or access rights published and/or requested by many individuals and/or entities, and disburse those preferences and/or rights to many nodes, for example multiple unmanned vehicles.

In other embodiments, redundant sensor and control system 145 can verify other operating conditions of the unmanned vehicle 140, such as speed and altitude. In the exemplary scenario of a drone unmanned vehicle 140, there may be a speed limit that the drone needs to fly within, or a flying altitude limit.

Also, there may be operating parameters regarding weather or mechanical parameters that are verified by the redundant sensor and control system 145. In an exemplary embodiment, one of the sensors as part of redundant sensor and control system 145 is a thermometer. An operating parameter may be that a flying drone can only operate within a certain temperature range. Thus, if the temperature is too high or too low, the redundant sensor and control system 145 may send a control signal to the unmanned vehicle 140 to return to a starting point or other location, either predetermined or dynamically selected location based on a nearest suitable location to current position.

In another exemplary embodiment, a sensor for measuring humidity in the air may be a part of redundant sensor and control system 145. If the air humidity becomes too high, or it starts raining, then the redundant sensor and control system 145 may send a control signal to the unmanned vehicle 140 to return to a starting point or other location.

In other embodiments, redundant sensor and control system 145 may monitor power (such as battery life) or other mechanical condition of the unmanned vehicle 140. If a certain threshold is crossed, then the redundant sensor and control system 145 may send a control signal to the unmanned vehicle 140 to cease operations and return to a starting point or other location. As would be understood by a person of ordinary skill in the art, any number of operating conditions and parameters of the unmanned vehicle 140 may be monitored by the redundant sensor and control system 145.

In other embodiments, the redundant sensor and control system 145 may utilize a clock independent of unmanned vehicle 140, or onboard unmanned vehicle 140. The clock may have a parameter for an approved amount of flying time. Exceeding the approved flying time may initiate the kill switch or autopilot control.

According to various embodiments, the redundant sensor and control system 145 initiates autopilot control of the unmanned vehicle 140 when the environmental data violates at least one of the conditions for approved operation of the unmanned vehicle 140. The autopilot control supersedes operation of the unmanned vehicle 140 by the control station 110. In some embodiments, the autopilot control initiates activation of a kill switch for operation of the unmanned vehicle 140. The kill switch is an emergency command resulting in the unmanned vehicle 140 returning to a launch location or other designated location under approved conditions.

Figure 2:
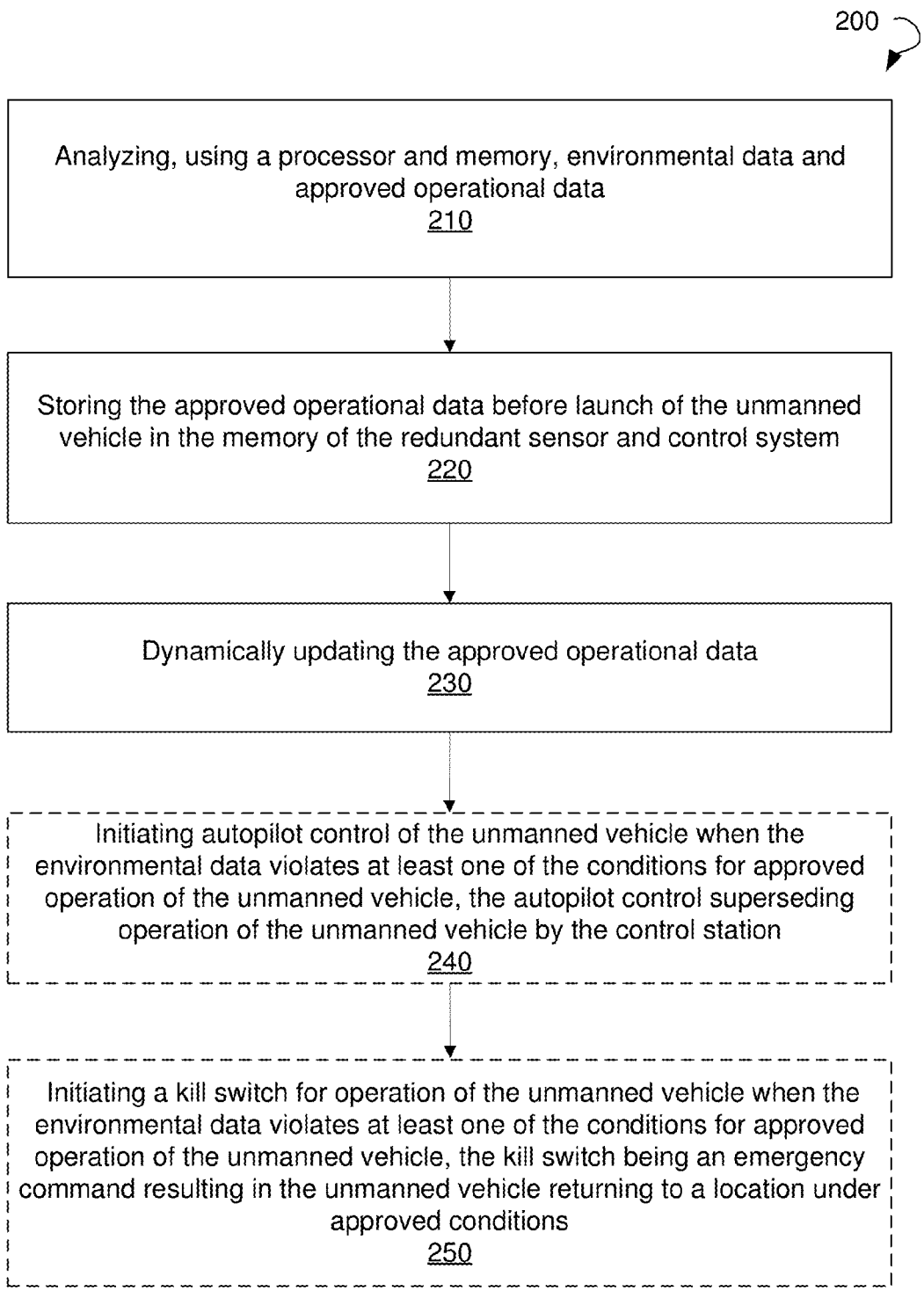
FIG. 2 is a simplified flow diagram for unmanned vehicle security and monitoring, according to embodiments of the present technology.

FIG. 2 shows a method for unmanned vehicle security and monitoring, according to embodiments of the present technology. While the method has been described in these discrete steps, various steps may occur in a different order, or concurrently. Additionally, in various embodiments, there can be fewer or additional steps. The method 200 may be executed by the system 100, and includes analyzing 210, using a processor and memory, environmental data and approved operational data, the approved operational data including at least one condition for approved operation of the unmanned vehicle. The method 200 includes storing 220 the approved operational data before launch of the unmanned vehicle in the memory of the redundant sensor and control system 145, hardware device or software. In various embodiments, the approved operational data includes at least one of a no entry zone, an operator generated condition, and other operational data from a third-party service (e.g., government regulation or private entity subscription service). The method 200 further includes dynamically updating 230 the approved operational data, where the approved operational data can include at least one of a no entry zone, an operator generated condition, and other operational data from a third-party service.

In various embodiments, the method 200 includes initiating 240 autopilot control of the unmanned vehicle when the environmental data violates at least one of the conditions for approved operation of the unmanned vehicle, the autopilot control superseding operation of the unmanned vehicle by the control station. The method 200 can further optionally include initiating 250 a kill switch for operation of the unmanned vehicle when the environmental data violates at least one of the conditions for approved operation of the unmanned vehicle, the kill switch being an emergency command resulting in the unmanned vehicle returning to a launch location or other safe location under approved conditions. In various embodiments, either autopilot control or a kill switch is initiated.

Figure 3:
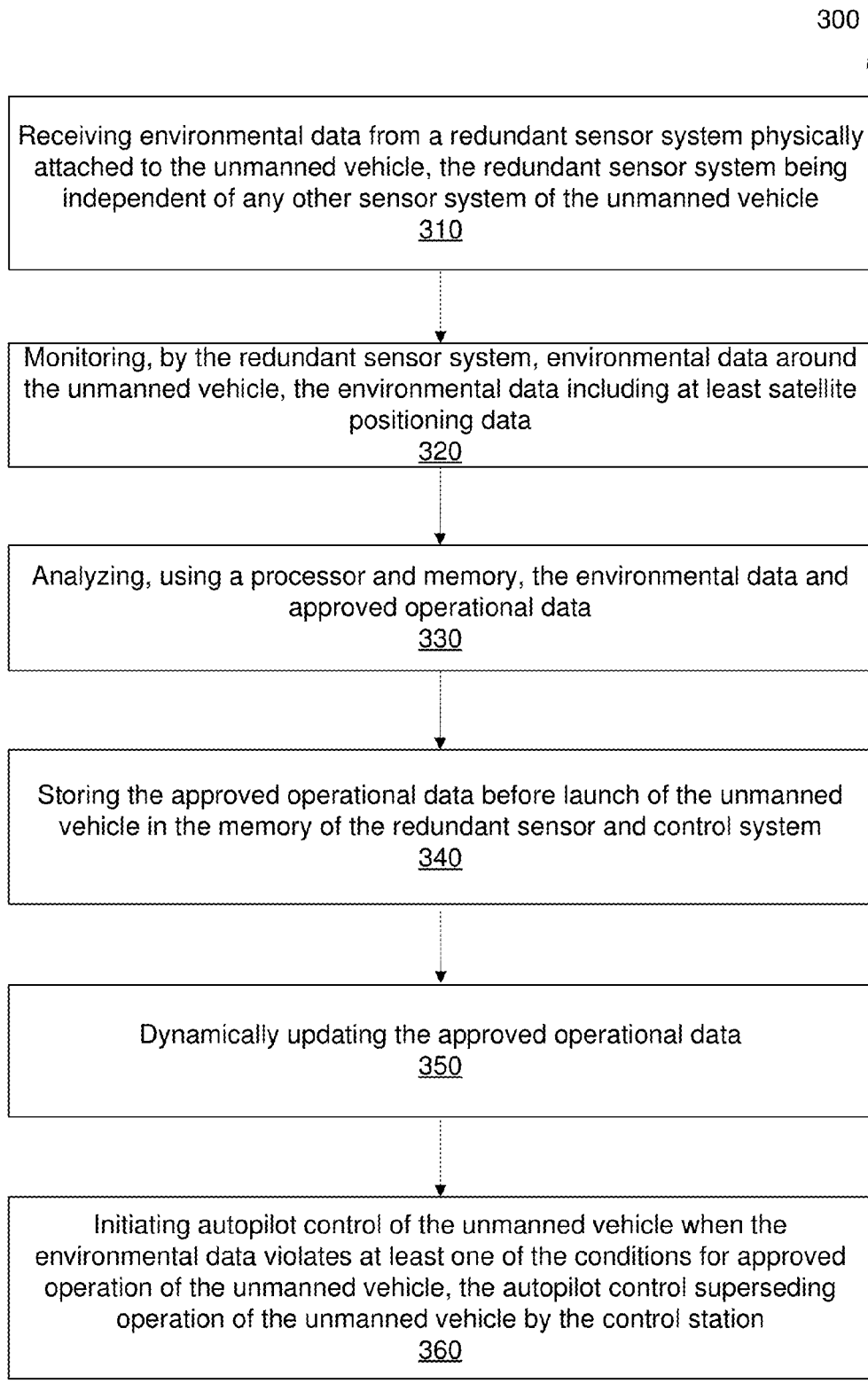
FIG. 3 is another simplified flow diagram for unmanned vehicle security and monitoring, according to embodiments of the present technology.

FIG. 3 shows a method for unmanned vehicle monitoring and security, according to embodiments of the present technology. While the method has been described in these discrete steps, various steps may occur in a different order, or concurrently. Additionally, in various embodiments, some steps of the method may be omitted. The method 300 may be executed by the system 100, and includes receiving 310 environmental data from a redundant sensor and control system physically attached to the unmanned vehicle, the redundant sensor and control system being independent of any other sensor system of the unmanned vehicle. The method 300 further includes monitoring 320, by the redundant sensor and control system, environmental data around the unmanned vehicle, the environmental data including at least satellite positioning data.

According to some embodiments, the method 300 includes analyzing 330, using a processor and memory, the environmental data and approved operational data, the approved operational data including at least one condition for approved operation of the unmanned vehicle. The method 300 further includes storing 340 the approved operational data before launch of the unmanned vehicle in the memory of the redundant sensor and control system. The approved operational data can include at least one of a no entry zone, an operator generated condition, and other operational data from a third-party service (e.g., government regulation or private company subscription service). The method 300 can optionally further include dynamically updating 350 the approved operational data. The method 300 also includes initiating 360 autopilot control of the unmanned vehicle when the environmental data violates at least one of the conditions for approved operation of the unmanned vehicle, the autopilot control superseding operation of the unmanned vehicle by the control station.

Figure 4:
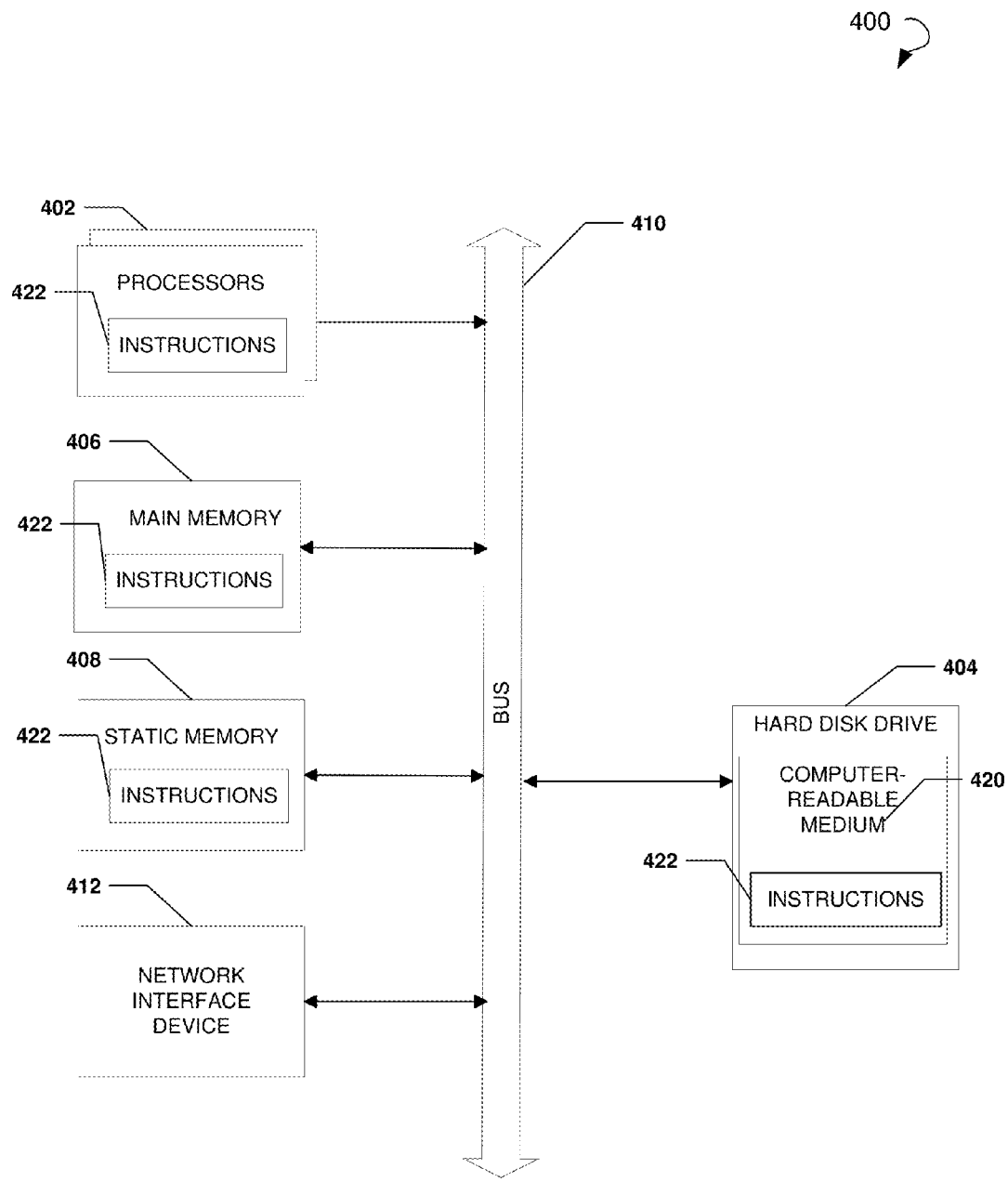
FIG. 4 is a simplified block diagram for a computing system, according to some embodiments.

Various embodiments of the present technology can be practiced with a local computer system, and/or a cloud-based system. FIG. 4 shows a diagrammatic representation of a computing device for a machine in the exemplary electronic form of a computer system 400, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set top box, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 402, a hard disk drive 404, a main memory 406 and a static memory 408, which communicate with each other via a bus 410. The computer system 400 may also include a network interface device 412. The hard disk drive 404 may include a computer-readable medium 420, which stores one or more sets of instructions 422 embodying or utilized by any one or more of the methodologies or functions described herein. The instructions 422 can also reside, completely or at least partially, within the main memory 406 and/or the static memory 408 and/or within the processors 402 during execution thereof by the computer system 400. The main memory 406, the static memory 408, and the processors 402 also constitute machine-readable media.

While the computer-readable medium 420 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, python™, JavaScript, Go, or other compilers, assemblers, interpreters or other computer languages or platforms.

The processing for various embodiments may be implemented in software that is cloud-based. In some embodiments, the computer system 400 is implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products, according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, systems and methods for secure unmanned vehicle operation and monitoring are described herein. While various embodiments have been described, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the present technology should, therefore, be determined not with reference to the above description, but instead should be determined with reference to the appended claims along with their full scope of equivalents.

What is claimed:

1. A system for unmanned vehicle monitoring and oversight, the system comprising:
    a first control station operable by a human operator for controlling an unmanned vehicle; wherein the unmanned vehicle is in communication with the first control station via a network, and the unmanned vehicle comprises:
        a first plurality of sensors in communication with the first control station, to monitor and control operating conditions of the unmanned vehicle; and
    a second hardware-based sensor and control system physically attached to the unmanned vehicle, the second hardware-based sensor and control system being a standalone device that is operable to monitor and control at least one of the operating conditions of the unmanned vehicle independently of the first plurality of sensors and independently of the first control station,
        the second hardware-based sensor and control system being further operable to:
            communicate with a third party regarding the at least one operating condition of the unmanned vehicle; and
            direct, via pre-programming, the unmanned vehicle to take certain action without further communication to any other control station, in accordance with the at least one operating condition.

2. The system of claim 1, wherein the unmanned vehicle is at least one of an unmanned aerial vehicle (UAV), an unmanned ground vehicle (UGV), an unmanned surface vehicle (USV), and an unmanned underwater vehicle (UUV).

3. The system of claim 1, wherein the second sensor and control system is communicably coupled, via a network, with a third party that is a private sector subscription entity providing real-time communication of at least one condition of approved operational data.

4. The system of claim 1, wherein the second sensor and control system monitors environmental data around the unmanned vehicle, the environmental data including at least satellite positioning data.

5. The system of claim 4, wherein the second sensor and control system analyzes, using a processor and memory, the environmental data and approved operational data, the approved operational data including the at least one operating condition for approved operation of the unmanned vehicle.

6. The system of claim 5, wherein the approved operational data is stored before launch of the unmanned vehicle in the memory of the second sensor and control system, the approved operational data including at least one of a no entry zone, an operator generated condition, and other operational data from the third-party.

7. The system of claim 5, wherein the approved operational data is dynamically updated in the memory of the second sensor and control system by real-time communication, the approved operational data including at least one of a no entry zone, an operator generated condition, and other operational data from the third-party.

8. The system of claim 5, wherein the second sensor and control system, using the processor and the memory, initiates autopilot control of the unmanned vehicle when the environmental data violates at least one of the approved operating conditions of the unmanned vehicle, the autopilot control superseding operation of the unmanned vehicle by the first control station.

9. The system of claim 8, wherein the autopilot control initiates activation of a kill switch for operation of the unmanned vehicle, the kill switch being an emergency command resulting in the unmanned vehicle returning to a launch or other safe landing location under approved conditions.

10. The system of claim 1, wherein the third party is communicably coupled with the second sensor and control system via a network, and the third party is a government regulatory entity providing real-time communication, the third party providing at least one condition of approved operational data.

11. The system of claim 10, wherein the government regulatory entity is the Federal Aviation Administration (FAA).

12. A method for unmanned vehicle monitoring, the method comprising:
    monitoring, by a first control system, operating conditions of the unmanned vehicle;
    receiving, by a stand-alone hardware-based second sensor and control system that is physically attached to the unmanned vehicle, at least one approved operating parameter regarding operation of the unmanned vehicle, wherein the second sensor and control system is operable to monitor and control at least one operating parameter of the unmanned vehicle, independent of the first control system of the unmanned vehicle, and independent of sensors relied on by the first control system of the unmanned vehicle; and
    overriding, by the second sensor and control system, control of the unmanned vehicle by the first control system, based on a violation of the at least one approved operating parameter; the overriding directing the unmanned vehicle to:
        communicate with a third party regarding the violation of the at least one approved operating parameter, or
        take certain pre-programmed action without further communication to any other control station.

13. The method of claim 12, further comprising storing approved operational data before launch of the unmanned vehicle in memory of the second sensor and control system, the approved operational data including at least one of a no entry zone, an operator generated condition, and an operating condition from a third-party service.

14. The method of claim 12, further comprising monitoring, by the second sensor and control system, environmental data around the unmanned vehicle, the environmental data including at least satellite positioning data.

15. The method of claim 14, wherein the overriding further comprises initiating autopilot control of the unmanned vehicle when the environmental data violates at least one condition for approved operation of the unmanned vehicle, the autopilot control superseding operation of the unmanned vehicle by the first control system.

16. The method of claim 14, wherein the overriding further comprises initiating a kill switch for operation of the unmanned vehicle when the environmental data violates at least one condition for approved operation of the unmanned vehicle, the kill switch being an emergency command resulting in the unmanned vehicle returning to a launch location or other safe location under approved conditions.

17. The method of claim 14, further comprising analyzing, using a processor and memory, the environmental data and approved operational data, the approved operational data including at least one condition for approved operation of the unmanned vehicle.

18. The method of claim 17, further comprising dynamically updating the approved operational data, the approved operational data including at least one of a no entry zone, an operator generated condition, and an operating condition from a third-party service.

19. A system for unmanned vehicle monitoring and oversight, the system comprising:
    a first control station operable by a human operator for controlling an unmanned vehicle; wherein the unmanned vehicle is communicably coupled, using a network, with the first control station, and the unmanned vehicle comprises a first plurality of sensors in communication with the first control station, to monitor and control operating conditions of the unmanned vehicle; and
    a second hardware-based sensor and control system physically attached to the unmanned vehicle, the second hardware-based sensor and control system being a standalone hardware-based device that is operable to monitor environmental data around the unmanned vehicle, the environmental data including at least satellite positioning data, independently of the first plurality of sensors and independently of the first control station,
        the second hardware-based sensor and control system being further operable to:
            communicate with a third party regarding the environmental data around the unmanned vehicle, or
            direct, via pre-programming the unmanned vehicle to take certain action without further communication to any other control station based on the environmental data around the unmanned vehicle.

20. The system of claim 19,
    wherein the second sensor and control system analyzes, using a processor and memory, the environmental data and approved operational data, the approved operational data including at least one condition for approved operation of the unmanned vehicle, the at least one condition for approved operation of the unmanned vehicle including at least one of a no entry zone, an operator generated condition, and a third-party regulation; and
    wherein the second sensor and control system, using the processor and the memory, initiates autopilot control of the unmanned vehicle when the environmental data violates the at least one condition for approved operation of the unmanned vehicle, the autopilot control superseding operation of the unmanned vehicle by the first control station, and initiating activation of a kill switch for operation of the unmanned vehicle, the kill switch being an emergency command resulting in the unmanned vehicle returning to a launch location under approved conditions.

\* \* \* \* \*